United States Patent [19]

Foss et al.

[11] Patent Number: 4,623,295

[45] Date of Patent: Nov. 18, 1986

[54] ONE-STEP LOADING ADAPTER

[75] Inventors: Dale R. Foss, St. Charles County; John H. Smith, St. Louis County, both of Mo.

[73] Assignee: The United States of America as represented by the Secretary of the Air Force, Washington, D.C.

[21] Appl. No.: 751,400

[22] Filed: Jul. 3, 1985

[51] Int. Cl.[4] .................................... B65G 7/12

[52] U.S. Cl. .................................... 414/608; 414/549; 414/590; 414/607

[58] Field of Search ............... 414/546, 549, 550, 589, 414/590, 607, 608, 728; 89/1.51

[56] References Cited

U.S. PATENT DOCUMENTS

| | | | |
|---|---|---|---|
| 2,479,623 | 8/1949 | Johnson | 414/607 |
| 2,780,377 | 2/1957 | Glenn et al. | 414/607 |
| 2,822,931 | 2/1958 | Sparrow | 214/1 |
| 2,911,118 | 11/1959 | Tapp | 414/549 |
| 2,931,519 | 4/1960 | Beach | 214/1 |
| 3,586,190 | 6/1971 | Lafferty | 414/607 |
| 3,974,737 | 8/1976 | Georgel et al. | 89/1.802 |
| 4,447,186 | 5/1984 | Renfro et al. | 414/589 |

FOREIGN PATENT DOCUMENTS

| | | | |
|---|---|---|---|
| 2821295 | 11/1978 | Fed. Rep. of Germany | 414/549 |

*Primary Examiner*—Joseph E. Valenza

*Attorney, Agent, or Firm*—Stanton E. Collier; Donald J. Singer

[57] ABSTRACT

A one-step loading adapter is attached to a lifting truck. The adapter is able to transport and position a store such as a missile from a storage location to an aircraft wing for mounting thereto without transfer to another device. The adapter has a removable boom assembly for lifting and lowering the store as desired. An adjustable cradle having three degrees of freedom is able to position the store for mounting once the store is loaded thereon.

7 Claims, 1 Drawing Figure

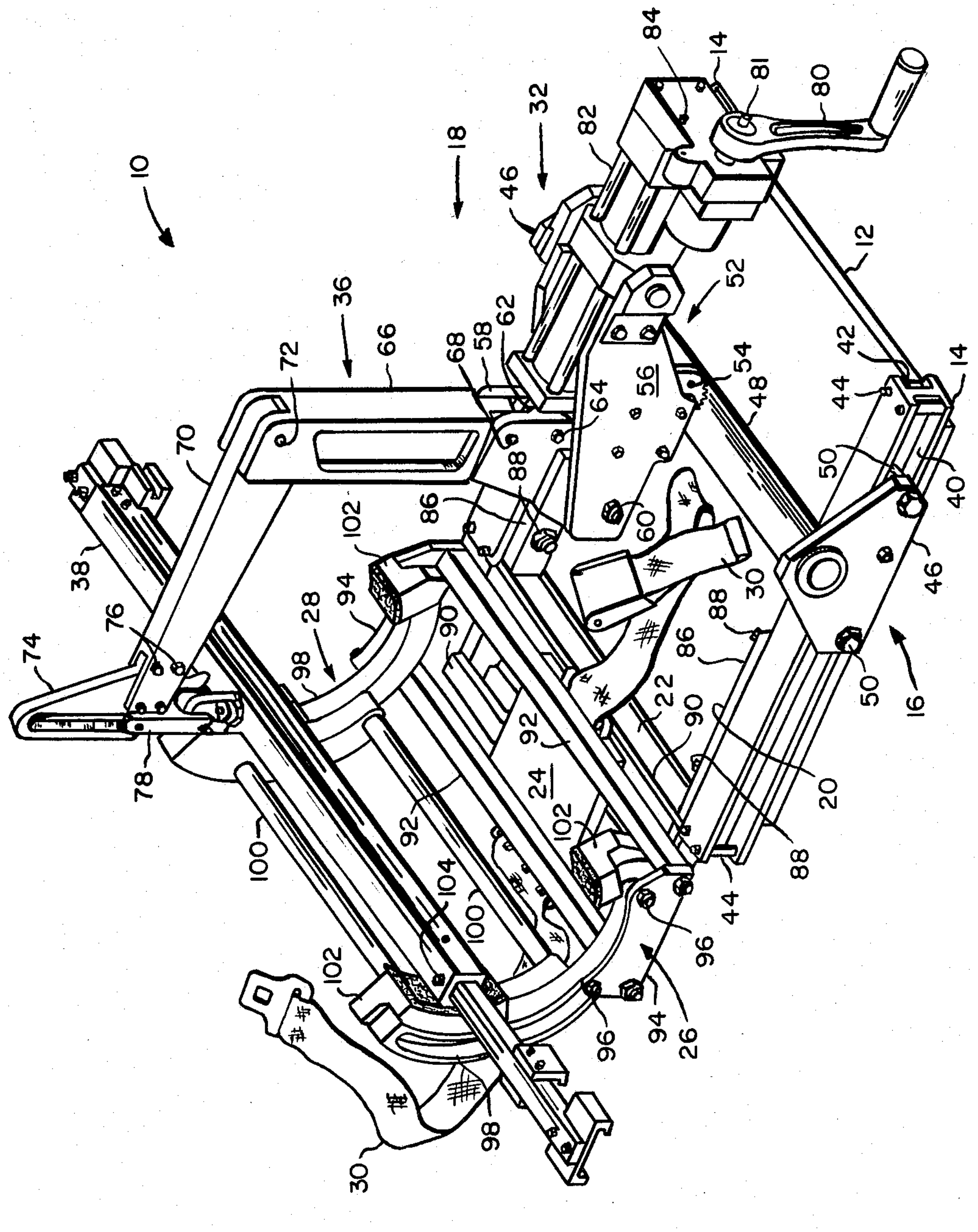
10
18
32
84
14
81
80
82
46
12
36
66
72
68
58
62
52
56
54
42
44
48
64
70
38
74
76
78
102
28
94
98
90
86
88
60
30
50
40
16
22
20
92
24
100
104
96
26

ONE-STEP LOADING ADAPTER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to apparatus for loading stores such as missiles onto aircraft, and, in particular, relates to apparatus that is able to remove stores from storage containers and positioning such stores onto the aircraft in one-step.

In the past several methods have been used to load stores onto aircraft.

The use of brute force can be used when store weights go over 100 or more pounds. Thus, for example, 4 persons would lift a missile from its container and carry it and position it under the aircraft mounting lugs. This technique clearly is very flexible in moving the store about if sufficient manpower is available. The greatest disadvantage, of course, is the accidental dropping of the store. Although stores are usually not armed until mounted upon the aircraft, accident explosion cannot be ruled out. The damage to property and life is clearly great. The chance for dropping increases the more fatigued the workers become and in a high turn-around combat situations this may be the weakest link in the safety chain. Also, the heavier stores may require 4 to 6 persons for safe handling. This increases the manpower needed to service aircraft.

Another technique involves lifting the store from the storage container and placing it in an interim holder such as a Y-stand. A lift truck would remove the store as required and would position the store under the aircraft wing. A chock-type cradle attached to the lift truck would be able to provide partial roll positioning. Fine adjustment in position would be required to place the store on aircraft attachment points. Existing cradles do not provide sufficient roll, fore and aft or side-to-side motion to completely eliminate the positioning problems. Other systems require interim handling of the stores during retrieval from container to loading aircraft.

These drawbacks have motivated a search for a device able to mount the store in a one-step operation.

SUMMARY OF THE INVENTION

The instant invention sets forth a one-step loading adapter for removing a store from a storage container and accurately positioning the store under an aircraft wing for mounting thereto and thereby overcomes the problems set forth hereinabove.

The adapter is attached to a table on a lift truck or a manual lift universal dolly.

A mounting plate of the present invention is attached to the table. A pair of parallel tracks being I beams are attached to the plate. A boom assembly is mounted on the outside tracks and a cradle assembly is mounted on the inside tracks to provide maximum fore and aft movement. A boom assembly with either a manual or hydraulic actuator is mounted to a boom trolley. A hoist beam of unique design for each store is attached to the boom.

The cradle assembly has a pair of tracks therein onto which is attached a lateral cradle trolley. A cradle base is mounted on the lateral cradle trolley. A cradle yoke is attached to the cradle base and the cradle yoke holds the store therein. The store in the cradle yoke may be moved fore and aft by the cradle assembly trolley, laterally by the lateral cradle trolley, and rotated about its longitudinal axis in the cradle yoke. The boom assembly can be moved fore and aft and in addition rotated about a vertical axis. The boom itself has two degrees of freedom.

Thus, one object of the present invention is a one-step loading adapter for lifting a missile or other store from any position in an all-up-round container, on a missile trailer, or on a storage rack.

Another object of the present invention is an adapter for transferring a missile to an integral adjustable cradle, for supporting the missile during transporting, and for supporting the missile during installation on the aircraft.

A further object of the present invention is an adapter for taking a missile from storage to installation on the aircraft without the use of other lifting or holding devices.

These and many other objects and advantages of the present invention will be readily apparent to one skilled in the pertinent art from the following detailed description of a preferred embodiment of the invention and the related drawings.

BRIEF DESCRIPTION OF THE DRAWING

The only FIGURE of the drawings shows in perspective view the one-step loading adapter of the present invention.

DETAILED DESCRIPTION OF THE PREFERRED EMBODIMENT

Referring to the only FIGURE, a one-step loading adapter 10 is shown in perspective.

Adapter 10 is removably attached to a mounting table, not shown, on a lifting device, not shown, such as an MJ-1 Lift Truck or an A/M32A-88 Manual Lift Universal Dolly.

Adapter 10 includes a mounting plate 12 having fixedly attached thereon two I beam tracks 14 in parallel, a boom trolley 16, a boom assembly 18, a cradle assembly trolley 20, a lateral track assembly 22, a lateral cradle trolley 24, a cradle base 26, a cradle 28, a hold down belt 30, a boom actuator 32 removably attached to boom trolley 16, a boom base 56, a boom 36, and a hoist beam 38.

Tracks 14 on mounting plate 12 are shaped like I beams and thus have an outside track 40 and an inside track 42. Stops 44 being bolts or pins prevent boom trolley 16 and cradle assembly trolley 20 from running off their respective tracks 14.

Boom trolley 16 has two support plates 46 and a fixed connecting member 48 such as a metal tube between plates 46. Two cam-follower type bearings 50 are attached to each support plate 46 and ride in outside track 40. Bearings 50 closely fit within track 40 so as to prevent tilting of boom assembly 18 when a load is lifted. Pins 44 prevent bearings 50 from running off tracks 40.

A pivoting post 52 supports boom assembly 18 and a pin lock 54 thereon functions to prevent rotation as desired and allows removal of boom assembly 18 from adapter 10 for storage or when needed for clearance under an aircraft wing.

Boom assembly 18 includes a base 56 that is pivotally connected to pivoting post 52 and a first boom section 58. First vertical boom section 58 pivots about a pin 60 attached to base 56. Also fixedly attached is manual actuator 14. An actuator shaft 62 is pivotally attached by pin 64 to first vertical boom section 58.

A second vertical boom section 66 is pivotally attached to first vertical boom section 58 by pin 68. Second boom section 66 can be rotated to the aft direction to store the boom assembly 18 but when attached it typically is held in the near vertical position as shown by a stop internal to first boom section 58. A horizontal boom section 70 is pivotally attached to second boom section 66 by pivot pin 72. A stop, not shown, prevents the downward movement of horizontal boom 70 relative to second vertical boom section 66 and thus boom 70 and boom section 66 are at about a 90 degree angle. A bracket 74 is fixedly attached by bolts 76 to horizontal boom 70. A coupling 78 is mounted between bracket 74 and hoisting beam 38.

Actuator 14 can be either manually driven or hydraulically driven. The greater the usage would most likely require hydraulic means, not shown. Handle 80 can be removed from handle shaft 81 and a hydraulic drive place thereon.

Ball screw actuator 14 is manually operated by a ratchet handle 80 to raise and lower a store. Handle 80 rotation is selected by a lever, not shown, on ratchet handle 80 that can be positioned to either side of neutral for clockwise or counterclockwise handle rotation. The neutral position of the lever allows handle 80 to assume a free wheeling condition. A no-back feature is built into a gear box portion 82 of actuator 14. The no-back prevents the inadvertent dropping of a missile supported by hoist beam 38 if ratchet handle 80 is unrestrained and free to rotate. The no-back consists of two sets of clutches that lock in a fail safe mode to avoid dropping the store being handled.

Actuator 14 has a gear drive release button 84 located adjacent to crank handle 80 that places the actuator drive mechanism in a free-wheeling mode for the rapid manual positioning of the unloaded boom 18 in preparation for attaching a store to beam 38 for lifting; release button 84 can be actuated while there is no load on lift boom 36 only by first applying a moderate manual force at the lift boom 36/actuator 32 attach point (as though attempting to retract the actuator piston). While maintaining a constant force towards the actuator piston, one depresses release button 84 to disengage the actuator drive mechanism to a free-wheeling mode. The actuator piston can then be rapidly extended or retracted to any position by applying an appropriate force at the lift boom 36.

Once the store is attached to hoist beam 38, the store is raised and positioned over cradle assembly 28.

Cradle assembly trolley 20 is constructed of two parallel beams 86 having two cam-follower type bearings 88 on each beam 86 which ride inside tracks 42 of tracks 14. Attached to the other ends of beams 86 is lateral track assembly 22 that is made of two "C" shaped tracks 90.

Lateral cradle trolley 24 having cam-follower type bearings, not shown, rides in C-shaped tracks 90 to provide a lateral degree of freedom. Fixedly attached to lateral cradle trolley 24 is a cradle base 26 beam constructed of two support rods 92 that are further attached to two end plates 94. End plates 94 have two cam-follower type bearings 96. Bearings 96 ride in cradle tracks 98. Cradle tracks 98 are fixedly held in position by connecting rods 100. A plurality of four pivoting support pads 102 provide support for the store when placed in cradle 28. Although not shown, conventional locks are provided to prevent the motion of cradle tracks 98, lateral track assembly 24, and cradle assembly trolley 20 once the store is loaded thereon. Each lock can be individually released to allow movement for positioning the store accurately under the aircraft attach lugs on whatever is used for holding the store. The details of one-step loading adapter (OSLA) 10 are provided in Table 1.

TABLE 1

| | | | |
|---|---|---|---|
| 1. | General | | |
| | MAXIMUM OPERATING TEMP | 71° C. | 160° F. |
| | MINIMUM OPERATING TEMP | −40° C. | −40° F. |
| | WEIGHT | 62 Kg | 135 POUNDS (APPROX.) |
| | SIZE | 483 mm × 508 mm × 1117.6 mm | 19" W × 20" H × 44" L |
| 2. | OPERATION | | |
| | FULL TRAVEL OF BOOM HANDLE REVOLUTIONS (CRANKS) | | 30 |
| | CRANK HANDLE FORCE | | 16 POUNDS (APPROX.) |
| | CRANK MOTION SIDE TO SIDE (LATERAL TRAVEL) | | ± 4 INCHES |
| | CRADLE MOTION FORE AND AFT (AXIS TRAVEL) | | ± 6½ INCHES |
| | BOOM MOTION ROTATION | | ± 90° |
| | BOOM MOTION ROTATION PIN LOCK (3 POSITIONS) | | −90°, 0°, +90° |
| | CRADLE MOTION IN ROLL | | 90° TRAVEL |
| | CRADLE STORES SIZES | | 5" DIA 7" DIA AND 8" DIA. |
| | CRADLE OR BOOM CAPACITY | | 510 POUNDS |
| 3. | HYDRAULICS (WITH MJ-1 LIFT TRUCK) | | |
| | HYDRAULIC KIT | | (6452A0001-01) |
| | PRESSURE | | 1500 PSI OPERATING |
| | FLOW | | LESS THAN 1 GPM REQUIRED TO OPERATE THE OSLA MOTOR |
| | VOLUME PER REVOLUTION | | 1.21 CU. IN. |
| | ACCESSORIES REQUIRED FOR HYDRAULIC MOTOR OPERATION: | | |
| | P/N 4B45C-2 (FMC 98296) | | (GFE; NSN 17300-00-894-0323) POWER TAKE OFF KIT |
| 4. | OSLA COMPATIBLE WITH AIRCRAFT: F-15, F-16 and F-4 | | |
| | OSLA COMPATIBLE WITH MISSLES: AIM-9, AIM-7, AIM-120A, AGM-45 (REQUIRES P/N 53E120002-1001 HOISTING BEAM.) | | |

The operation of one-step loading adapter 10 is as follows:

a. Rotate the crank handle 80 clockwise (CW)/counterclockwise (CCW) to raise/lower boom assembly 18.

b. Attach hoist beam 38 to the lugs of the missile. Position the hoist beam fork clevis on the forward lug of the missile. Remove the ball lock pin 104 to release the telescoping rod equipped with a fitting for engaging the missile aft lug. Slide the rod rearward into the missile lug and secure the rod with ball lock pin 104.

If the missile is oriented in the wrong direction for installation of the aircraft launcher, it can be rotated, tail first, under the truck/dolly boom, while suspended from hoist beam 38 of one-step adapter 10. This operation is accomplished with the wings and fins removed from the missile.

c. Manually rotate the crank handle 80 CW to retract actuator 32 and raise the horizontal boom 70 and missile to the elevated position.

d. Slide cradle assembly 28 under missile (rotate cradle slightly to clear missile waveguide tunnel).

e. Lower missile by rotating crank handle 80 CCW. Position waveguide tunnel, if such, located on bottom of missile into the appropriate notch in the bottom of cradle 28.

f. Tighten side to side, fore and aft and roll locks as deemed necessary.

g. With the weight of the missile on cradle assembly 28, disconnect hoist beam 38 from missile lugs.

h. Three (3) options are available to facilitate hoist beam/boom assembly clearance with the aircraft during the missile loading phase. The hoist beam/boom assembly may be rotated ±90° about post 52, as a first option of positioning the beam/boom assembly 36. (The spring loaded lock pin is released at the base of the post to facilitate this rotational action.) A second option is to elevate and rotate the hoist beam 38/boom assembly 18 back until it is resting over the crank handle 80 and gear box assembly 82. (This option may be used in conjunction with option 1, if necessary, to clear aircraft structure during loading operation.) A third option is to completely remove the hoist beam 38/boom assembly 18 by lifting it out of post 52.

i. Secure the missile in cradle 98 with missile hold-down belt 30 provided with OSLA 10; and j. One-step loading adapter 10 is then ready to be moved with the missile in place. The missile can be accurately positioned to be attached to the missile launcher on the aircraft by only one person.

Clearly, many modifications and variations of the present invention are possible in light of the above teachings and it is therefore understood, that within the inventive scope of the inventive concept, the invention may be practiced otherwise than specifically claimed.

What is claimed is:

1. A one-step loading adapter, said one-step loading adapter is removably attached to a lifting truck, said one-step loading adapter being able to transport a store from a storage location to a loading position on an aircraft wing, said one-step loading adapter comprising:

a mounting plate, said mounting plate being removably attached to said lifting truck, said mounting plate having a pair of parallel tracks fixedly mounted thereon, each of said tracks having an inside and an outside track thereon;

a boom assembly trolley, said boom assembly trolley translateably mounted in said outside tracks, said boom assembly trolley having a pivot post;

a boom assembly means, said boom assembly means removably mounted in said pivot post of said boom assembly means trolley, said boom assembly means able to lift and lower a store;

a cradle assembly trolley, said cradle assembly trolley being translateably mounted in said inside tracks, said cradle assembly trolley having fixedly mounted thereon a lateral track assembly;

a cradle trolley, said cradle trolley translateably mounted in said lateral track assembly; and an adjustable cradle, said adjustable cradle mounted to said cradle trolley; and means for holding said store in said adjustable cradle;

wherein said store in said adjustable cradle is able to be moved fore and aft, laterally, and rotationally.

2. A one-step loading adapter as defined in claim 1 wherein said parallel tracks are shaped like I beams.

3. A one-step loading adapter as defined in claim 1 wherein said boom assembly trolley includes two support plates having cam-follower type bearings thereon, and said support plates joined by a connecting member having said pivot post thereon.

4. A one-step loading adapter as defined in claim 1 wherein said boom assembly means includes a base removably mounted to said pivot post; an actuator, said actuator fixedly attached to said base, said actuator having a shaft for biasing, a first boom section, said first boom section pivotally connected to said base and to said shaft of said actuator; a second boom section being pivotally conneted to said first boom section and resting upon a stop in a substantially vertical position; a horizontal boom section, said horizontal boom section pivotally connected to said second boom section and resting on a stop in a substantially horizontal position; a bracket, said bracket fixedly attached to said horizontal boom section; a coupling, said coupling movably attached to said bracket; and a hoist beam, said hoist beam removably attached to said coupling and to said store during lifting and lowering of said store.

5. A one-step loading adapter defined in claim 4 wherein said actuator is manually powered.

6. A one-step loading adapter as defined in claim 4 wherein said actuator is hydraulically powered.

7. A one-step loading adapter as defined in claim 1 wherein said adjustable cradle includes two end plates having cam-follower type bearings thereon; connecting means for fixedly holding said end plates, said connecting means further fixedly attached to said cradle trolley; a pair of C-shaped tracks, said C-shaped tracks rotatably mounted on said cam-follower type bearings of said end plates; connecting means for fixedly holding said C-shaped tracks; and a plurality of pivoting support pads attached to said C-shaped tracks for holding said store without damage thereto.

* * * * *